United States Patent [19]

Jankowski

[11] Patent Number: 4,862,738
[45] Date of Patent: Sep. 5, 1989

[54] TEST SYSTEM FOR WHEEL BEARINGS
[75] Inventor: Richard B. Jankowski, South Bend, Ind.
[73] Assignee: Allied-Signal, Inc., Morristown, N.J.
[21] Appl. No.: 87,484
[22] Filed: Aug. 20, 1987
[51] Int. Cl.[4] ............................................. G01M 17/04
[52] U.S. Cl. ........................................ 73/118.1; 73/12
[58] Field of Search ................. 73/118.1, 865.9, 866.4, 73/12, 9, 10

[56] References Cited

U.S. PATENT DOCUMENTS

| | | | |
|---|---|---|---|
| 2,033,588 | 3/1936 | Pigott et al. | 265/10 |
| 2,872,805 | 2/1959 | Cochran, Jr. et al. | 73/10 |
| 2,957,335 | 10/1960 | Dmitroff | 73/10 |
| 3,152,468 | 10/1964 | Powell | 73/8 |
| 3,529,783 | 2/1968 | Alsbach et al. | 73/12 |
| 3,715,909 | 2/1973 | Wolanin | 73/9 |
| 3,821,893 | 7/1974 | Klinger et al. | 73/118.1 |
| 3,913,394 | 10/1975 | Niehaus | 73/118 |
| 3,946,593 | 3/1976 | Ruget | 73/10 |
| 4,000,656 | 1/1977 | Moioli | 73/432 R |
| 4,133,201 | 1/1979 | Klinger | 73/865.9 |
| 4,501,139 | 2/1985 | Petersen | 73/118 |

Primary Examiner—Hezron E. Williams
Attorney, Agent, or Firm—Larry J. Palguta; Ken C. Decker

[57] ABSTRACT

The wheel bearing test system (10) comprises a wheel (20) and bearings (40) mounted on an axle mechanism in order to effect realistic testing of the bearings (40). The axle mechanism (30) comprises a mandrel assembly (30) which is attached to a T-shaped connecting member (50). An axial load application mechanism (60) is disposed substantially coaxially with the axle mechanism (30), and is attached to one leg (52) of the T-shaped connecting member (50). A pair of radial and moment load application mechanisms (72, 74) are attached to the top legs (54, 56) of the T-shaped connecting member (50) and disposed substantially orthogonally relative to the axle mechanism (30). A motor (12) is connected with a wheel attachment fixture (18), the attachment fixture (18) fixed to the wheel (20) in order to effect rotation thereof. Operation of the wheel bearing test system (10) imposes realistic axial, radial, and moment loading upon the bearings (40) in their intended operational environment.

20 Claims, 1 Drawing Sheet

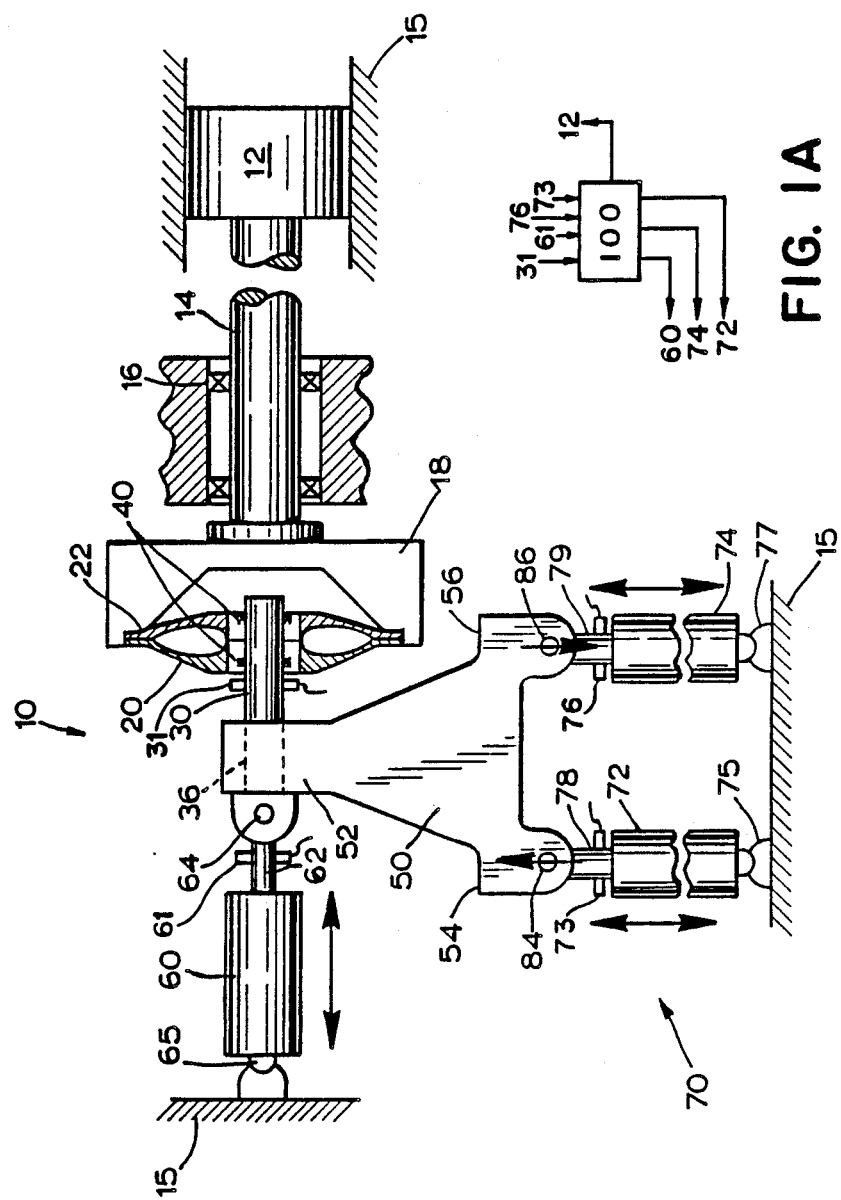

TEST SYSTEM FOR WHEEL BEARINGS

The present invention relates generally to a wheel bearing test system, in particular a wheel bearing test system for aircraft wheel bearings.

BACKGROUND OF THE INVENTION

Many testing devices have been provided in order to test components prior to utilization in their intended environment. It is highly desirable to provide a testing apparatus that effects as realistic an environmental testing as possible. There is a need for an aircraft wheel bearing test system which will provide realistic duplication of the actual environment in which the wheel and bearings will operate. The bearing test system should provide an accurate means for evaluating aircraft wheel bearings while mounted in a simulated wheel and on a simulated axle both of which provide representative aircraft component stiffness, functions, and operational environment. The test system must be capable of producing loads comparable to those developed during actual aircraft operation sequences, i.e., ramp positioning, taxi maneuvers, takeoffs, drift landings, and so on.

SUMMARY OF THE INVENTION

The present invention comprises motor means connected with a fixed support, a wheel connected with the motor means, axle means upon which the wheel is mounted via wheel bearings, an axial load application mechanism disposed substantially coaxially with said axle means, a radial and moment load application mechanism, a connecting member connecting together the axial load application mechanism, radial and moment load application mechanism, and axle means, load sensing devices associated with the load mechanisms, and control means, so that activation of the respective load mechanisms effects the selective imposition of loads upon the bearings during rotation of the wheel by the motor means and when the wheel is at rest.

DESCRIPTION OF THE DRAWINGS

One way of carrying out the invention is described in detail below with reference to the drawings which illustrate a specific embodiment, in which:

FIG. 1 is a schematic representation of the wheel bearing test system of the present invention and FIG. 1A is a schematic representation of the control mechanism of the present invention.

DETAILED DESCRIPTION

The wheel bearing test system of the present invention is indicated generally by reference numeral 10 in FIG. 1. System 10 comprises a motor 12 including a shaft 14, the motor 12 attached to a fixed support 15. The motor shaft is surrounded by load reaction bearings 16. Attached to the motor-driven shaft 14 is a wheel attachment fixture 18 shaped to receive the outer radial flange portions of an aircraft wheel 20. Aircraft wheel 20 may have the outer radial flanges removed in order to simplify its attachment by bolts 22 to the support structure 18. The wheel is mounted upon mandrel assembly or axial means 30. The mandrel assembly or axle means 30 has positioned thereabout test bearings 40, which typically comprise roller bearings utilized in aircraft wheel assemblies, or other bearings depending on the type of wheel and bearings to be tested. The axle means 30 is nonrotably attached along area 36 to a T-shaped connecting member 50. T-shaped connecting member 50 comprises legs 52, 54, and 56. Disposed substantially coaxially with axle means 30 is an axial load application mechanism 60. Mechanism 60 is pivotally attached at 65 to fixed member 15 and includes a cylinder rod 62 pivotally attached at 64 to leg 52 of T-shaped connecting member 50. The axial load application mechanism comprises an axial hydraulic load cylinder that is aligned substantially linearly with the axle means. Located substantially orthogonally relative to axle means 30 is a pair of radial and moment load application mechanisms indicated generally by reference numeral 70. Mechanism 70 comprises a pair of hydraulic radial and moment load cylinders 72 and 74, each pivotally attached at 75, 77, respectively, to fixed support 15. The pivotal attachments at 65, 75, and 77 allow multi-planar movement of connecting member 50, and thus the axle means 30 is multi-planar movable by means of the multi-planar movable connecting member 50 to which the axle means is fixedly connected. At the other end, cylinders 72 and 74 have rods 78 and 79 attached pivotally at pivot points 84 and 86 on respective legs 54 and 56 of T-shaped connecting mechanism 50. Each load cylinder 60, 72, and 74 includes therewith load sensing devices 61, 73, and 76, respectively, which enable the loading forces effected by the respective hydraulic cylinders to be sensed and communicated to a control mechanism 100. The control mechanism 100 receives the sensed loads and ensures that the appropriate forces are effected by the respective cylinders in order to effect the desired loading forces which are inputted to the controller. Additionally, strain gauges and rotary encoders may be placed on each cylinder rod to detect bending of the rods. The strain gauges and rotary encoders can communicate with the control mechanism 100 (typically a computer) so that the control mechanism compensates for bending and accurate results are obtained.

The wheel bearing test system of the present invention enables a highly accurate and realistic testing of wheel bearings while in their intended environment. At the start of each test sequence, all load sensing devices are electronically zeroed to a reference point wherein they are representative of an unloaded position. The controller receives, via the load sensing devices, the applied loads, and may record temperature variations. A load sensing device 31 on the mandrel 30 provides verification of the composite-applied loads magnitude. Motor 12 effects rotation of wheel 20 while mechanisms 60 and 70 are actuated selectively to provide a singularly or in combination: axial loading, radial loading, and moment loading applied via the axle means 30. Hydraulic cylinders 72 and 74 may be actuated selectively so that a net radial load is applied to the wheel bearings, or so that a combination radial load and moment load is applied to the wheel bearings. By controlling selectively the operation of the motor via the controller, various operational sequences may be run in order to duplicate the environment in which the wheel bearings operate during ground turns, drift landings, a five-point brake roll, maneuvering at low speeds, takeoffs, and landings. It has been found that the most severe wear experienced by wheel bearings is during maneuvering and takeoff operations. Thus, the environment of these operations can be successfully duplicated and repeated any selected number of times in order to test the capability of the wheel bearings. It is possible to impose infinite load variations upon the wheel bearings because of the orientation and number of load cylinders. Also, the loading effected upon wheel bearings by stationary aircraft can be effected simply by actuating the appropriate load cylinders.

While the invention has been described with respect to the detailed embodiment, it will be understood that the invention is capable of numerous rearrangements, modifications, and alterations, and such are intended to be within the scope of the appended claims. It is reasonably to be expected that those skilled in the art can make numerous revisions and additions to the invention and it is intended that such revisions and additions will be included in the scope of the following claims as equivalents of the invention.

I claim:

1. A wheel bearing testing system, comprising motor means connected with a fixed support, a wheel connected with the motor means and rotatable by the motor means, multi-planar movable axle means upon which the wheel is mounted via wheel bearings, an axial load application mechanism disposed substantially coaxially with said axle means, a radial and moment load application mechanism, a multi-planar movable connecting member connecting together the axial load application mechanism, radial and moment load application mechanism, and multi-planar movable axle means, the axle means attached fixedly to the connecting member, load sensing devices associated with the load application mechanisms, and control means, so that activation of the respective load application mechanisms effects through the multi-planar movable axle means the selective imposition of multi-planar loading upon the bearings so that the bearings experience realistic operating conditions during rotation of the wheel by the motor means and when the wheel is at rest.

2. The bearing testing system in accordance with claim 1, wherein the connecting member comprises a generally T-shaped member having the axial load application mechanism attached at one leg, and the radial and movement load application mechanism attached to the other two legs thereof.

3. The bearing testing system in accordance with claim 1, wherein the radial and moment load application mechanism comprises a pair of radial and moment load cylinders, each load cylinder attached to a respective leg of the T-shaped member.

4. The bearing testing system in accordance with claim 3, wherein the load cylinders are disposed substantially orthogonally relative to the axle means.

5. The bearing testing system in accordance with claim 4, wherein the axial load aplication mechanism comprises an axial hydraulic load cylinder disposed substantially in linear alignment relative to the axle means.

6. The bearing testing system in accordance with claim 5, wherein the axle means comprises a mandrel onto which the wheel is mounted.

7. The bearing testing system in accordance with claim 6, wherein the motor means includes a support structure to which the wheel is affixed, rotation of the support structure effecting rotation of the wheel.

8. The bearing testing system in accordance with claim 7, wherein the axial load application mechanism is disposed substantially perpendicular relative to the radial and moment load cylinders.

9. The bearing testing system in accordance with claim 8, wherein the radial and moment load cylinders are attached to legs comprising two legs aligned in linear alignment with one another and perpendicular to the one leg to which the axial load application mechanism is attached, actuation of the radial and moment load cylinders effecting, selectively, radial and moment loading upon said bearings.

10. The bearing testing system in accordance with claim 9, wherein selective actuation of the radial and moment load cylinders effects a net radial load upon the bearings.

11. The bearing testing system in accordance with claim 1, wherein the wheel bearings comprise aircraft wheel bearings and the wheel comprises wheel means for an aircraft.

12. The bearing testing system in accordance with claim 1, wherein the load sensing devices communicate to the control means the magnitudes of loads applied by the mechanisms to the axle means.

13. A method for testing bearings by a testing system, comprising the steps of (a) disposing a wheel on multi-planar movable axle means via bearings, (b) connecting the wheel with motor means for rotation of the wheel, (c) attaching an axial load mechanism to a multi-planar movable connecting member connected fixedly with the multi-planar movable axle means so that the axial load mechanism is disposed substantially coaxial relative to the multi-planar movable axle means, (d) attaching a radial and moment load mechanism to the multi-planar movable connecting member so that the radial and moment load mechanism is disposed substantially orthogonal relative to the multi-planar movable axle means, (e) providing control means for controlling operation of the testing system, (f) providing load sensing devices for sensing loads imposed by the mechanisms on the bearings, and (g) activating selectively, via the control means, the respective load mechanisms in order to effect through the multi-planar movable axle means the selective imposition of multi-planar loading upon the bearings so that the bearings experience realistic operating conditions when the wheel is at rest and during rotation of the wheel by the motor means.

14. The method in accordance with claim 13, further comprising the step of attaching each load mechanism to a pivotable mounting.

15. The method in accordance with claim 13, further comprising the step of attaching each load mechanism to a pivotable connection on the connecting member.

16. The method in accordance with claim 15, wherein the radial and moment load mechanism comprises a pair of radial and moment load hydraulic cylinders.

17. The method in accordance with claim 16, further comprising the step of disposing the radial and moment load hydraulic cylinders in parallel alignment with one another.

18. The method in accordance with claim 17, further comprising the step of the connecting member being provided as a generally T-shaped member having the axial load mechanism attached to one leg thereof and the radial and moment load hydraulic cylinders attached along a second leg disposed perpendicular relative to the one leg.

19. The method in accordance with claim 18, further comprising the step of providing load reaction bearings for an output shaft of the motor, the output shaft being connected with the wheel.

20. The method in accordance with claim 19, wherein the wheel bearings comprise aircraft wheel bearings upon which is mounted an aircraft wheel.

* * * * *